Patented Jan. 22, 1952

2,583,359

UNITED STATES PATENT OFFICE 2,583,359

OLEFIN HYDRATION

Roland F. Deering, Long Beach, Calif., assignor to Union Oil Company of California, Los Angeles, Calif., a corporation of California No Drawing. Application May 7, 1949, Serial No. 92,083

18 Claims. (Cl. 260—641)

This invention applies to a process for the hydration of olefins and especially to novel catalysts for this reaction.

It is known that alcohols may be produced by the hydration, that is the addition of water, to olefins. For example, in this manner ethylene may be converted to ethyl alcohol, propylene to isopropyl alcohol, etc. It is also known that the reaction may be carried out in the vapor phase in the presence of solid catalysts. Among the best catalysts which have been proposed previously are acid salts of phosphoric acid, which are made by reacting phosphoric acid with oxides such as cadmium oxide, the phosphoric acid being used in substantial molal excess such as 2:1 Ortho, pyro and meta phosphoric acids and phosphates have all been used.

It has now been found that exceptionally active catalysts for the hydration of olefins may be prepared by combining phosphoric acid with carbides such as silicon carbide, the carbide being employed preferably in substantial molal excess, and the conditions of preparation and use being such as to prevent the dehydration of the phosphoric acid to the meta form.

As a specific example of a catalyst of this invention, a silicon-carbide-phosphoric acid catalyst was prepared as follows: About 45 grams of granular carborundum was soaked in about 100 g. of an aqueous solution containing about 50% by weight of orthophosphoric acid for a period of about 4 hours at atmospheric temperature. The excess liquid was drained off and the residue was dried at 200° C. for about 15 hours. Titration with dilute alkali of a water suspension of the product indicated the presence of 17.3% acidity as orthophosphoric acid, which is equivalent to a molal ratio of carbide to orthophosphoric acid of over 10.1. This catalyst was employed in a hydration operation as follows: About 50 ml. of the above catalyst was placed in a steel reaction tube and maintained at a temperature of about 275° C. while a gaseous stream consisting of about 35% water and 65% ethylene, under a pressure of about 500 lbs./sq. in. gage, was passed over the catalyst at such a rate that the contact time was about 54 seconds. The water and alcohol in the product gases were condensed and separated by distillation. Under these conditions over a period of about 4 hours, an average of about 2.0% of the ethylene was converted to ethyl alcohol. This conversion is about 46% of the equilibrium value, that is, the maximum conversion theoretically possible under these conditions. In another run made under similar conditions except for the use a catalyst having an acidity corresponding to about 40% orthophosphoric acid, and the use of a gaseous feed containing 50% water and 50% ethylene, the conversion obtained was 4.9%, which is about 75% of the equilibrium value. Other specific examples will be found below.

In the catalysts of this invention, the carbide does not act as an inert carrier for the phosphoric acid but appears to form some type of complex which is not formed with inert carriers such as pumice, charcoal, alundum, alumina, etc. Catalysts similar to the above catalyst prepared by the use of pumice in place of the carborundum, for example, when tested under the above conditions gave no appreciable conversion to alcohol.

In the preparation of the silicon-carbide-phosphoric acid catalysts of this invention, the carbide is preferably immersed in an aqueous solution of orthophosphoric acid and then dried, the excess solution being preferably though not necessarily drawn off before drying. The temperature of the impregnation may be varied widely but is conveniently atmospheric temperature. The strength of the impregnating solution may also be varied widely, the more concentrated solutions being preferred except where the resulting solution becomes too viscous for ready handling. The temperature of drying of the impregnated catalyst is preferably between about 105° C. and 240° C. The upper limit of temperature is determined by the point at which the orthophosphoric acid begins to dehydrate substantially to pyrophosphoric acid, the latter form of acid being somewhat less desirable for hydration purposes. The drying time need only be long enough to leave no liquid on the product. If desired, the impregnation may then be repeated to increase the amount of phosphoric acid taken up. Catalysts having acidities indicative of orthophosphoric acid contents between about 5% and about 70% may be employed, although minor proportions between about 17% and 40% are preferred.

Although silicon carbide is preferred for the purposes of this invention, other carbides of elements of group IV other than carbon, especially those of titanium and zirconium, but also those of cerium, thorium, tin and lead, may be used. It is also preferable to use phosphoric acid itself for the impregnation of these carbides, but the salts of this acid may also be used provided an excess of the phosphoric acid over the phosphate salt is present. If salts are employed in this manner, those of the metals of the first, second and third "transitional" groups are preferred. These transitional groups include those elements having electronic structures such that the differentiating electron is in the second from the outermost shell; that is, the outermost shell remains substantially unchanged with two electrons, while the second from the outermost shell is being built up from eight to eighteen electrons. The metals of the first transitional group are those having atomic numbers between 21 and 30 and include scandium, titanium, vanadium, chromium, manganese, iron, cobalt, nickel, copper and zinc. Those of the second transitional group have atomic numbers between 39 and 48 and include yttrium, zirconium, columbium, molybdenum, masurium, ruthenium, rhodium, palladium, silver and cadmium. Those of the third transitional group have atomic numbers 57 and 72 to 80 and include lanthanum, hafnium, tantalum, tungsten, radium, osmium, iridium, platinum, gold and mercury. In impregnating the carbides with phosphoric acid and the above metallic salts, the carbides may be immersed first in an aqueous solution of orthophosphoric acid; then the material thus impregnated is further impregnated with an aqueous solution of a soluble salt such as the chloride or nitrate of the desired metal or metals. The impregnations may also be carried out in the reverse order. The solid material may be dried between the impregnations if desired, and additional impregnations may be also employed to obtain the desired amounts of salts and acid. The conditions of impregnation and drying may be substantially as described above for the silcon-carbide-phosphoric acid catalyst. By these methods of course, the metal phosphate replaces part of the phosphoric acid of the catalyst. The number of equivalents of phosphoric acid should be substantially greater than the number of equivalents of metal, so that the metal phosphate will generally be in the range of about 1% to 50% and preferably not over about 25%.

The above catalysts are suitable for the hydration of any olefin but are particularly suitable for the hydration of the normally gaseous olefins such as ethylene, propylene and the butenes. These may be employed in mixtures such as are found in gases produced in cracking operations, for example, or other mixtures.

Suitable operating conditions for the hydration of the above olefins lie within temperature ranges of about 150° C. to about 300° C., preferably about 175° C. to 240° C.; pressures between about 1 and 200 atmospheres, preferably between about 10 and 60 atmospheres; and contact times between about 1 second and 10 minutes. Steam must be employed, and the proportion of steam to olefin should be between about 10% to 15% and about 75%. The general effects of these reaction conditions are as follows: The lower temperatures, the higher pressures, and the higher steam ratios increase the degree of hydration; the higher temperatures reduce the contact time required; and the higher proportions of steam increase the total condensate obtainable from the product gas while decreasing the concentration of alcohol in the condensate. The conditions of temperature, pressure and concentration are so adjusted as to insure the maintenance of the vapor phase reaction. It is possible to conduct the operation in the liquid phase also but it is preferable to employ the vapor phase. When propylene is hydrated, the temperature conditions are preferably somewhat lower than for ethylene, a maximum of about 250° C. being preferable. The optimum temperatures are about 260° C. for ethylene and 180° C. for propylene. Slightly lower maximum temperatures are preferred for the higher olefins.

As an example of the hydration of propylene, a silicon-carbide-phosphoric acid catalyst prepared as in the above example (using about 80% orthophosphoric acid solution for the impregnation) and having an acidity corresponding to about 40% orthophosphoric acid, was employed in an operation similar to the above hydration operation except that the temperature was held at about 190° C. and the pressure at about 300 lb./sq. in. gage. The hydrocarbon feed stock consisted of about 75% propylene and 25% propane, and the gaseous stream passed over the catalyst consisted of about 75% of this hydrocarbon feed and 25% steam. The isopropyl alcohol recovered by condensing the condensibles in the product and separating the water by distillation, amounted to 4.0% of the propylene in the feed, which is about 54% of the equilibrium value. The operation was continued for about 100 hours without appreciable loss in activity of the catalyst.

Another catalyst was prepared by impregnating about 10% by weight of cadmium phosphate and about 30% by weight of phosphoric acid on a silicon carbide carrier, first impregnating the carrier with cadmium chloride solution, drying this product, and impregnating it with phosphoric acid solution and drying. This catalyst was tested for the hydration of isobutylene at a temperature of about 140° C. and a pressure of about 60 pounds gage. A space velocity of 277 volumes of feed per volume of catalyst was employed, with a feed containing about 32.5% steam, and a conversion of about 4.7% was obtained, the liquid product containing about 26% alcohol, 60% water, and 14% polymer.

In a similar operation, using a catalyst prepared by manganese chloride and phosphoric acid impregnations of titanium carbide, and containing about 10% of manganese phosphate and about 25% of phosphoric acid, slightly lower yields were obtained with slightly more polymerization. Similar results were obtained when zirconium carbide was used in the carrier instead of titanium carbide.

In another run a catalyst containing about 35% phosphoric acid impregnated on silicon carbide was used at a temperature of about 160° C. and a pressure of about 200 pounds gage and a space velocity of about 96 volumes of feed per volume of catalyst. The feed contained about 1 volume steam for every 3 volumes of isobutylene. A conversion of about 4.8% was obtained, the liquid product containing about 40% alcohol, 55% water, and only about 5% polymer.

In another operation a catalyst was prepared by impregnating silicon carbide with about 40% of phosphoric acid and about 5% of silver phosphate, by successive impregnations of the silicon carbide with phosphoric acid and silver nitrate solutions followed by drying with a temperature of about 240° C. This catalyst was tested for the hydration of ethylene at a temperature of about 260° C., pressure of 415 pounds gage and a space velocity of about 77 volumes of feed per volume of catalyst. About 20% steam was used in the ethylene feed, and a conversion of about 2.5% was obtained, the liquid product containing about 20% ethyl alcohol, 71% water, and 9% ethyl ether.

A similar catalyst was prepared using zinc chloride solution in place of the silver nitrate solution and obtaining a catalyst containing about 35% phosphoric acid and 15% zinc phosphate. This was tested for the hydration of propylene at a temperature of about 180° C., a pressure of about 340 pounds gage, and a space velocity of about 79 volumes per volume of catalyst per hour. A 2.95% conversion was obtained, and a liquid product contained about 32% alcohol and 68% water.

Similarly catalysts may be prepared by impregnating the carbides of this invention with phosphoric acid with or without solutions of any of the above metal salts to obtain products containing phosphoric acid and the carbides of this invention with or without the metal phosphates; and these catalysts are of unusual value for the hydration of olefins to produce alcohols.

Although the invention has been described with particular reference to hydration of olefins these catalysts are also very active for other reactions. For example, acetylenes may be hydrated to obtain ketones, aldehydes, and unsaturated alcohols. In this reaction acetylenes having 2 to about 4 carbon atoms are preferred but the higher acetylenes may also be hydrated. The temperatures required are somewhat higher than those required for the olefin hydration given above, a maximum of about 400° C. being permissible. Very high proportions of water vapor are also desirable, to maintain the catalyst in the ortho or preferably in the pyro form without allowing it to dehydrate substantially to the meta form which appears to be inactive. When the pyro form is desired to predominate, the catalyst drying temperatures may also be higher, up to about 300° C., and more acid may be absorbed, up to acidities corresponding to 80 to 90% orthophosphoric acid being permissible.

The above catalysts are also active polymerization catalysts and for this purpose also are preferably employed substantially in the pyro form rather than the ortho form. The temperature conditions for polymerization are preferably between about 240° C. and about 300° C. although somewhat higher temperatures up to about 400° C. may also be employed. The temperature should not be so high, however, as to dehydrate the catalyst substantially to the meta form. Water vapor should also be employed in the reaction to prevent such dehydration of the catalyst but the amount of water vapor should not be so high as to cause hydration of the olefins to dominate the polymerization reaction. Ratios of water vapor to olefin between about 2% and 10% are suitable. Pressure conditions for polymerization may be in approximately the same range or slightly lower range than the hydration reaction.

This application is a continuation-in-part of my copending application Serial No. No. 521,681 filed February 9, 1944, now abandoned.

Variations in the process of recovery of reaction products such as the use of azeotropic distillation, solvent extraction and the like, recycling of the unreacted gas, use of moving bed or fluid catalyst contacting systems, and other variations which would occur to one skilled in the art are to be included in the scope of the invention as defined in the following claims.

I claim:

1. A process for the preparation of alcohols and polymers which comprises contacting an olefin with water at an elevated temperature not greater than about 300° C. in the presence of a catalyst comprising phosphoric acid and a carbide of an element of group IV other than carbon.

2. A process for the preparation of alcohols, which comprises reacting a normally gaseous olefin with steam in the vapor phase at an elevated temperature not greater than about 300° C. and superatmospheric pressure in the presence of a catalyst comprising orthophosphoric acid and a carbide of an element of group IV other than carbon.

3. A process according to claim 2 in which the pressure is above about 10 atmospheres, and the amount of steam employed is over about 15% of the total steam plus olefin present.

4. A process for the preparation of alcohols, which comprises reacting a normally gaseous olefin with steam in the vapor phase at a temperature below about 300° C., in the presence of a catalyst comprising orthophosphoric acid and silicon carbide.

5. A process for the hydration of olefins which comprises reacting an olefin with water at a superatmospheric pressure and an elevated temperature not greater than about 300° C. In the presence of a catalyst consisting essentially of orthophosphoric acid impregnated on a carbide of an element of group IV other than carbon, the carbide being present in substantial molal excess.

6. A Process according to claim 5 in which the carbide is titanium carbide.

7. A process according to claim 5 in which the carbide is zirconium carbide.

8. A process according to claim 5 in which the carbide is silicon carbide.

9. A process according to claim 5 in which the carbide is silicon carbide and the orthophosphoric acid constitutes about 17% to about 40% of the catalyst.

10. A process for the hydration of olefins which comprises reacting an olefin with water at a superatmospheric pressure and an elevated temperature not greater than about 300° C. in the presence of a catalyst comprising orthophosphoric acid and a phosphate of at least one metal selected from the group consisting of the metals of the first, second and third transitional series, both impregnated on a carbide of an element of group IV other than carbon, the carbide being present in substantial molal excess over the orthophosphoric acid, and the orthophosphoric acid being present in excess over the phosphate salt.

11. A process according to claim 10 in which the carbide is silicon carbide.

12. A process according to claim 10 in which the carbide is titanium carbide.

13. A process according to claim 10 in which the carbide is zirconium carbide.

14. A process for the polymerization of a normally gaseous olefin which comprises subjecting a gas containing said olefin to an elevated temperature not greater than about 300° C. in the presence of steam and a catalyst comprising phosphoric acid and a carbide of an element of group IV other than carbon.

15. A process according to claim 14 in which the carbide is silicon carbide.

16. A process according to claim 14 in which the carbide is titanium carbide.

17. A process according to claim 14 in which the carbide is zirconium carbide.

18. A process for the polymerization of a normally gaseous olefin which comprises subjecting a gas containing said olefin to a temperature between about 240° C. and 300° C. in the presence of steam and a catalyst comprising pyrophosphoric acid and silicon carbide.

ROLAND F. DEERING.

REFERENCES CITED

The following references are of record in the file of this patent:

UNITED STATES PATENTS

| Number | Name | Date |
|---|---|---|
| 1,978,270 | Joshua et al. | Oct. 23, 1934 |
| 2,018,066 | Ipatieff | Oct. 22, 1935 |
| 2,020,674 | Dreyfus | Nov. 12, 1935 |
| 2,050,445 | Metzger | Aug. 11, 1936 |
| 2,084,390 | Dreyfus | June 22, 1937 |
| 2,126,952 | Dreyfus | Aug. 16, 1938 |